J. K. PRIEST.

HAIR CLIPPER.

No. 11,411. Reissued Apr. 10, 1894.

Witnesses

C. Everance

W. Harvey Muzzy.

Inventor

Joseph K. Priest by Munn & Co.

Attorneys

THE NATIONAL PRINTING CO. WASHINGTON, D.C.

UNITED STATES PATENT OFFICE.

JOSEPH K. PRIEST, OF NASHUA, NEW HAMPSHIRE.

HAIR-CLIPPER.

SPECIFICATION forming part of Reissued Letters Patent No. 11,411, dated April 10, 1894.

Original No. 478,461, dated July 5, 1892. Application for reissue filed September 29, 1893. Serial No. 486,834.

*To all whom it may concern:*

Be it known that I, JOSEPH K. PRIEST, a citizen of the United States, residing at Nashua, in the county of Hillsborough and State of New Hampshire, have invented certain new and useful Improvements in Hair Clippers and Shears; and I do hereby declare the following to be a full, clear, and exact description of the invention, such as will enable others skilled in the art to which it appertains to make and use the same.

My invention relates to hair-clippers for barbers' use.

The object of my invention is, while greatly simplifying and increasing the durability of hair-clippers, to afford room below the movable handle and between it and the comb-plate, for the location of the spring by which the cutter is enabled to shear or clip the hair on the return stroke of the movable handle, and by so locating it render the clipper more compact and of less height between the spring-pressure-regulating nut and the comb-plate; and also afford great convenience in applying the spring to the handles; and also afford convenience for the removal of the spring and separation of the parts of the clipper, either for sharpening the cutter, repairing, removing an old and putting in a new spring, cleaning, oiling, or for other operations; it being simply necessary to remove the nut, bolt, comb, and cutter plates, and invert the clipper, to have the parts exposed, so that either or all of the above mentioned operations can be performed.

My invention will be more fully understood by the following specification, claims and drawings.

Figure 1:
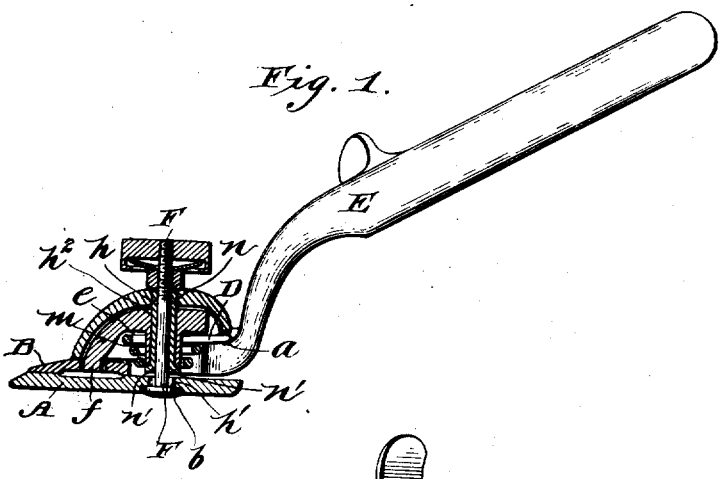
Figure 2:
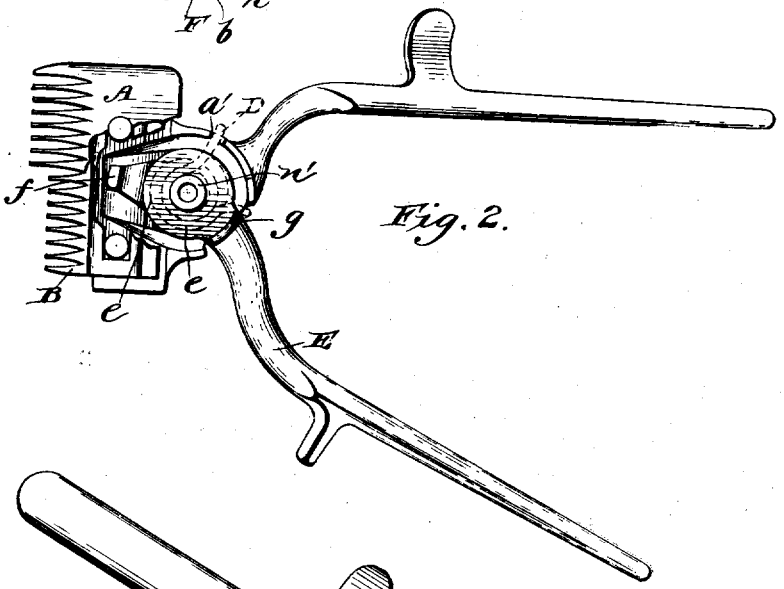
Figure 3:
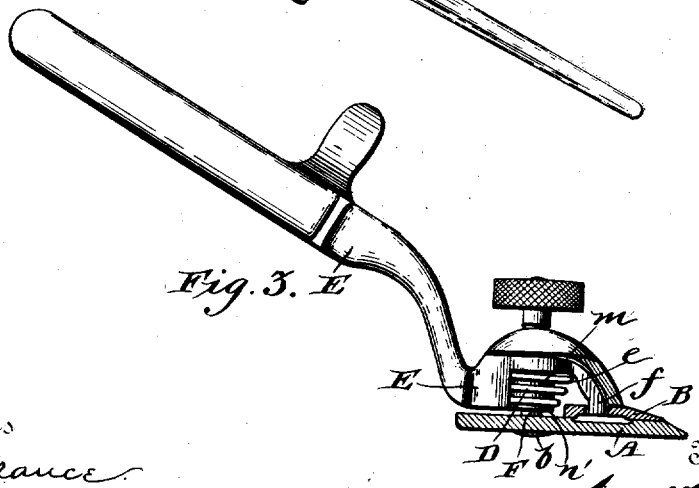

In the accompanying drawings, Figure 1 is a vertical central section of my improved clipper; Fig. 2 an inverted plan view, with some of the parts removed; and Fig. 3 a side elevation, with a portion of the housing connected with the stationary handle broken away to expose the arched form of the movable handle and the relation of other parts.

A in the drawings is the comb-plate which passes through the hair, and B the movable cutter-plate which reciprocates on the top of said plate and effects the cutting operation by pressing the hair against the teeth of the plate A and simultaneously shearing it off. The stationary lever has a hollow crowning-housing which extends over the comb-plate nearly its full width and forward upon the cutter-plate as well as to, or beyond both of its ends, and when pressed down in the usual manner it acts, at its front edge, with a screw-tempered spring-pressure, to keep the comb and cutter plates in the nicest relative cutting relation to one another. This housing is also formed with a guide-way for the comb-plate, lugs for connecting the comb and cutter plates, and with stops and notches for the application of the spiral spring D and the movable handle E to the stationary handle, substantially the same as in most clippers of this type, the only changes being such as adapt the improved parts for use in a clipper. The movable handle E is formed arching or bowing, as indicated at *e*, and at the front base end of this arched portion the usual cutter-operating toe *f* is provided, and in rear of this toe at the rear base portion of the arched portion a shoulder *g*, which acts as a stop and a bearing for one portion of the spring, is provided. The housing of the stationary handle, the comb-plate, and the arched portion of the movable handle are provided with coinciding passages, as is indicated at $h$, $h'$, $h^2$ and in the passage $h^2$ a hollow pendent cylindrical bearing $m$ is fitted and secured by rivet or otherwise; or it may be cast upon the movable handle. Through the bearing $m$ another hollow cylindrical bearing $n$, having a supporting shoulder $n'$, is passed upward into the passage $h$ of the stationary handle and fastened by riveting or a screw thread. The construction of the axial portion of the clipper might be modified in many ways without changing the principle of my invention. For instance, a separate revolving sleeve might be provided outside the axial portion, and the spring located outside this sleeve. Outside the axial portion the spiral spring D, preferably of inverted conical form, is applied and its ends secured in notches $a$, $a'$ of the handles, as shown, or in the usual manner, provided said notches are set at such relative attitudes as the new relation of the spring requires. The coupling tension screw-bolt F is formed with a keying-head $b$ on its lower end and a screw-thread on its upper protruding end, and after it is passed through the comb-plate, the cylindrical bearings, and the housing of the stationary handle, receives a tension- nut and spring on its screw-threaded end, as shown. This bolt holds the parts together when the clipper is operated in any position and with the nut also enables the required spring-tension to be secured.

By my invention all the parts can be made, arranged, and fitted at the smallest cost, and when the clipper is completed and being used its operation is found very perfect, while the labor of repairing and cleaning is greatly reduced.

What I claim as my invention is—

1. In a clipper, a movable cutter, operating handles, a comb plate; and a spring connected to said handles and arranged in a space or chamber below the highest portion of the inner end of the pivotally movable handle, whereby compactness is secured and provision is made for the removal of the spring in a downward direction, after the comb plate is removed, without changing the relation of the handles to each other, substantially as described.

2. In a clipper, the combination of the cutter-operating-handle formed with an arched or bowed portion, and with a pendent hollow cylindrical bearing; the stationary handle having a housing portion, and a hollow shouldered cylindrical bearing projecting from said housing portion and passing through the cylindrical bearing of the movable handle; the coupling and spring-tension key-bolt, the comb-plate, the cutter-plate, and a spring arranged in a space between the arched portion of the movable handle and the upper surface of the comb-plate and made removable in a downward direction when the comb-plate is removed, substantially as described.

3. An organized clipper having the cutter, and handles, one of which is pivotal and the other practically stationary; and the spring arranged in the space or chamber, and connected to the handle portions, and made removable downwardly, on removal of the comb plate, without changing the relation of the handle portions to each other, substantially as described.

4. In a clipper, a reciprocating cutter and vibrating operating handle, in combination with an axial portion, a stationary handle, comb plate and a power spring connected to said handles; said operating, vibrating handle, and the other parts named, being constructed to allow of the spring being arranged about said axial portion, and below the forward portion of the movable handle; whereby compactness is secured and the spring can be removed downwardly when the comb plate is removed, substantially as described.

In testimony whereof I hereunto affix my signature in the presence of two witnesses.

JOSEPH K. PRIEST.

Witnesses:
CHAS. H. AUSTIN,
CARRIE E. ARMSTRONG.